(12) United States Patent
Jackson

(10) Patent No.: US 6,217,639 B1
(45) Date of Patent: Apr. 17, 2001

(54) CONTAMINATION CONTROL BREATHER

(75) Inventor: Ronald R. Jackson, Brentwood, TN (US)

(73) Assignee: Fluid Protection Corporation, Rockwall, TX (US)

( * ) Notice: Subject to any disclaimer, the term of this patent is extended or adjusted under 35 U.S.C. 154(b) by 0 days.

(21) Appl. No.: 09/183,322

(22) Filed: Oct. 30, 1998

(51) Int. Cl.[7] ................................................ B01D 53/04
(52) U.S. Cl. ......................... 96/134; 55/385.4; 96/147
(58) Field of Search ................... 55/385.4; 96/117.5, 96/108, 134, 135, 132, 147, 140, 141, 142

(56) References Cited

U.S. PATENT DOCUMENTS

| | | | |
|---|---|---|---|
| 1,402,348 | * 1/1922 | Garner | 55/385.3 |
| 1,784,067 | * 12/1930 | Holtson | 55/385.4 |
| 2,283,043 | * 5/1942 | Busch | 96/141 |
| 2,325,657 | * 8/1943 | Burkness | 96/132 |
| 2,511,726 | * 6/1950 | Lockwood | 96/147 |
| 2,784,801 | * 3/1957 | Lunde | 55/385.4 |
| 3,090,490 | * 5/1963 | Yocum | 96/134 |
| 3,208,203 | * 9/1965 | Markevitch | 96/147 |
| 3,266,229 | * 8/1966 | Witkowski | 55/385.4 |
| 3,681,899 | * 8/1972 | Grote | 96/147 |
| 3,728,848 | * 4/1973 | Vest, Jr. | 96/147 |
| 4,026,688 | * 5/1977 | Patterson | 96/132 |
| 4,146,277 | * 3/1979 | Santoro | 96/134 |
| 4,147,096 | * 4/1979 | Caswell | 55/385.4 |
| 4,175,671 | * 11/1979 | Holl et al. | 55/385.4 |
| 4,388,086 | * 6/1983 | Bauer et al. | 55/385.4 |
| 4,401,093 | * 8/1983 | Gates, Jr. et al. | 55/385.4 |
| 4,504,289 | 3/1985 | Waller | 55/316 |
| 4,548,624 | 10/1985 | Waller | 55/274 |
| 4,689,057 | * 8/1987 | Gasper | 55/385.4 |
| 5,575,832 | * 11/1996 | Boyd | 96/117.5 |
| 5,914,415 | * 6/1999 | Tago | 55/385.4 |
| 6,015,444 | * 1/2000 | Craft et al. | 55/385.4 |

* cited by examiner

Primary Examiner—Duane S. Smith
(74) Attorney, Agent, or Firm—Fulbright & Jaworski L.L.P.

(57) ABSTRACT

Air enters the contamination control breather through openings in the top cap of the breather. Air then passes through air channels in the top cap. Dust particles are filtered by a filter assembly near the top of the breather, which also diffuses the air. The diffused air then passes through material which removes moisture, other gases, and liquids from the air. The air is then passed through another filtration layer to remove the desiccant particles from the air. The clean and dry air ultimately passes to a container or machinery, that uses filtered air, through an aperture in the bottom cap of the breather. The bottom cap can be permanently attached to the container so that only the elongated body and the filter assemblies need to be replaced when the desiccant reaches its maximum adsorption capacity.

16 Claims, 8 Drawing Sheets

CONTAMINATION CONTROL BREATHER

RELATED APPLICATIONS

Reference is hereby made to commonly assigned and U.S. design patent application CONTAMINATION CONTROL BREATHER, Ser. No. 29/095,902, filed concurrently herewith, and which is incorporated herein by reference now U.S. Design Pat. No. D421,150.

TECHNICAL FIELD OF THE INVENTION

The present invention relates to a contamination control breather and more particularly to such a breather for use in conjunction with air inflow and outflow to and from machinery to ensure that air passing into and out of the machinery is free of certain contaminants such as acids, salts, solid particles, liquids, water vapor, combustible substances, and other gases.

BACKGROUND OF THE INVENTION

It is well known that when fluid is removed from a closed fluid container the pressure inside the container drops, which may result in collapse of the container. However, this does not happen in open systems because the pressure difference between the inside and outside of the container causes air to pass into the container and replace the fluid that has been removed. Conversely, as fluid is pumped into the container, air is forced out. The air that moves in and out of the container has many contaminants that may be harmful to the fluid inside the container, other objects in the vicinity of the container and also to the container itself As a result, the fluid inside the container can become contaminated over time and thus, will have to be changed, resulting in economic loss.

For example, water vapor that is associated with the air can cause rust and oxidation of the container, which will result in deterioration of the fluid, as well as damage to the container, which then will have to be changed periodically. Moreover, solid particles in the air stick to the container causing wear and tear of the container. Additionally, the solid particles cause abrasive wear on components serviced by the fluid. For example, in hydraulic systems, the fluid flows through cylinders, or in a gear box where the fluid is in contact with gear surfaces, solid particles will cause wear on such parts. Furthermore, acids and salts in the air may react with the fluid or the container causing further degradation of the fluid and/or the container. This kind of chemical reaction may further result in corrosion, overheating and microbial growth.

On the other hand, air leaving such containers may be harmful to the environment. For example, as a battery is recharged, gas containing contaminants, like hydrogen and sulphuric acid gas are released into the atmosphere. Note that hydrogen gas is combustible and sulphuric acid gas is corrosive. Consequently, gas recharge areas are subject to strong regulation regarding health and safety. Moreover, open flames are often used in these work areas increasing the risk of explosions.

The filtering of air to remove dust particles and moisture before entering the fluid container has been illustrated in patents issued to Waller et al, U. S. Pat. Nos. 4,504,289 and 4,548,624 (hereinafter "Waller"). In systems, such as Waller, air enters through an aperture at the bottom of the breather cap (bottom being defined as the portion of the breather cap positioned nearest to the container) and passes upward through two particle filters and desiccant before being allowed to enter the top opening of a central standpipe. The filtered air flows downward through the standpipe into the container. Such systems do not provide for any filtration or cleaning of the air once the air enters the standpipe. Since the standpipe extends from the top to the bottom of the breather it may introduce contaminants into the air before the air enters the container. The longer the path that the air travels to enter the container after it has been filtered, the greater the likelihood of the air being contaminated when it enters the container. Moreover, air leaving the container and flowing backward up the standpipe will contain dust particles and other contaminants that will stick to the inside of the standpipe causing the incoming air to become contaminated. Thus, the air entering the container is not as clean as it should be.

Furthermore, the amount of desiccant used by such systems for a particular size breather is limited due to the presence of the central standpipe which occupies substantial space inside the breather. This reduces the adsorption capacity of the breather resulting in more frequent replacements of the desiccant and the breather. The breather and the desiccant being replaced more frequently results in increased contamination. Failure to change the desiccant and the filters at periodic intervals increases the likelihood that the desiccant and/or the filters will be contaminated and thus not effective. Furthermore, since air in existing systems enters the breather through an aperture at the bottom, it is more likely that outside condensation will also flow into the breather along with the air thereby increasing the water vapor inside the container.

Therefore, there is a need in the art for a system which solves these and other deficiencies of known systems, while providing a contamination control breather for fluid containers and other air displacement systems.

Another object of the present invention is to provide a contamination control breather in which air is forced to pass through a maximum amount of desiccant per unit volume before entering the container.

A further object of the present invention is to provide a contamination control breather in which air is forced to pass through a maximum amount of activated charcoal per unit volume before leaving the breather.

Still, a further object of the present invention is to provide a contamination control breather in which air passes directly to the container after passing through the filters, the activated charcoal and the desiccant.

Still a further object of the present invention is to provide a contamination control breather in which the two caps are the same size.

Still a further object of the present invention is to provide a contamination control breather with a color indicator to indicate when the maximum adsorption capacity of the desiccant has been reached.

Still a further object of the present invention is to provide a contamination control breather with anti-static filters to reduce the potential for explosion that exists in any dusty environment.

Still a further object of the present invention is to provide a contamination control breather with diffusers to ensure maximum effectiveness within the desiccant chamber.

Still a further object of the present invention is to provide a contamination control breather that forces the incoming air to pass through the filters and the desiccant.

Still a further object of the present invention is to provide a contamination control breather that forces the outgoing air to pass through filters, desiccant, charcoal and a flame retardant disc.

Still a further object of the present invention is to provide a contamination control breather with strong supports to connect the breather to containers that are highly agitated in their normal operation.

Still a further object of the present invention is to provide a contamination control breather for controlling the amount of air that goes in the breather.

Still a further object of the present invention is to provide a contamination control breather with a constant cross-section throughout its entire length.

Still a further object of the present invention is to provide a contamination control breather for neutralizing harmful contaminants present in gases or air, leaving the breather.

SUMMARY OF THE INVENTION

These and other objects, features and technical advantages are achieved by a system and method having a first embodiment, whereby outside air enters through openings in the top cap of the breather and flows through the breather toward the container. The top cap is the cap that is away from the end where the container is located. These openings are present near the bottom of the top cap, and force the air to flow slightly upward before flowing down through the filtering process. The advantage of such a system is that condensation on the top of the cap does not go inside the breather. The air then passes through a filter assembly near the top portion of the tube of the breather, and then through a substantial amount of desiccant contained in the tube of the breather. In a preferred embodiment, the desiccant is silica gel which changes color to indicate that replacement of the breather is required. However, any kind of desiccant will effectuate the purpose of the invention.

After passing through the desiccant, the air passes through another filter assembly near the bottom of the breather which is enclosed within the breather. In a preferred embodiment, this bottom filter assembly is identical to the one used at the top, but positioned in the opposite direction to the top filter assembly. However, for purposes of the invention, these filter assemblies need not be identical. After passing through the second filter assembly the clean and dry air passes through a neck of the bottom cap of the breather and into the container or other air device requiring filtered air.

In the preferred embodiment, the filter assembly includes an outer tube with a wiper ring, and a diffuser inside the wiper ring positioned inside the tube. In between the wiper ring and the diffuser, is a filter cloth enclosing the diffuser on all sides, except the side facing the desiccant. The thin edge of the wiper ring seals tightly against the inside diameter of the tube, thus preventing airflow around the assembly. The advantage of this arrangement is that incoming air cannot directly enter the desiccant without first passing through the filter assembly. The filter cloth of the filter assembly is preferably a 2 micron particle filter, which is knitted differently on both sides such that when the air comes in, the cloth becomes a filter (by closing down) which prevents the solid particles from passing through. On the other hand, when air flows out of the container into the filter, the cloth opens up, thereby allowing partial cleaning of the filter cloth. In the preferred embodiment the diffuser is a polyester pad.

In another embodiment of the present invention, the number of filter assemblies used in the breather can be varied. These filter assemblies need not be identical. Furthermore, the amount of desiccant used in a particular breather can be changed by varying the length of the tube or by simply leaving some empty space in the tube. The empty space may be filled with an inert material to prevent movement of the desiccant.

In another embodiment of the present invention, the bottom cap can be reinforced, for example, with metal, to eliminate the stress at the neck. A metal plate may be inserted in the bottom cap, and a connection with the container can be made by directly placing a connecting pipe through the neck of the bottom cap into the container, such that the air moves from the bottom cap directly into the container through the connecting pipe.

In another embodiment of the present invention, the elongated tube is threaded near the bottom to facilitate mating with the bottom cap. In this embodiment the bottom cap is threaded on the inside. Alternatively, the bottom cap can be permanently attached to the fluid container so that only the tube along with the filter assemblies needs to be replaced.

In another embodiment of the present invention, in order to remove gases, the tube of the breather may include activated charcoal, which complements or is used instead of the desiccant.

In another embodiment of the present invention, a flame retardant disc may be located in the breather to retard flames from entering the breather. This disc fits tightly against the inside of the breather and stops flames from entering the breather.

Accordingly, one technical advantage of the invention is the provision of an air contamination control device and system which allows air to flow from top to bottom without passing through any unfiltered areas for any substantial path lengths prior to entering the air utilization device.

Another technical advantage of the invention is that the number of filter assemblies used in a particular breather depends upon the type of use, the extent of filtration, and cleaning required.

Another technical advantage of the invention is that the amount of desiccant can be varied depending on the amount of water vapor in the air in a particular environment.

Another technical advantage of the invention is that the bottom cap can be permanently fixed to the fluid container, especially where the containers vibrate during their normal operation.

Another technical advantage of the invention is that the inside of the breather can be filled with different substances to selectively remove other solids, liquids, or gases as needed.

Another technical advantage of the invention is that the tube, along with the filters, can be replaced without the need for replacing the bottom cap.

Another technical advantage of the present invention is that a flame retardant disc can be located inside the tube of the breather.

A still further technical advantage of the present invention is the provision of a contamination control breather with bidirectional air flow, in which incoming air is cleaned and dried, and outgoing air partially regenerates the desiccant and back flushes the particle filter to prolong the life of the breather.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed maybe readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE INVENTION

Figure 1:
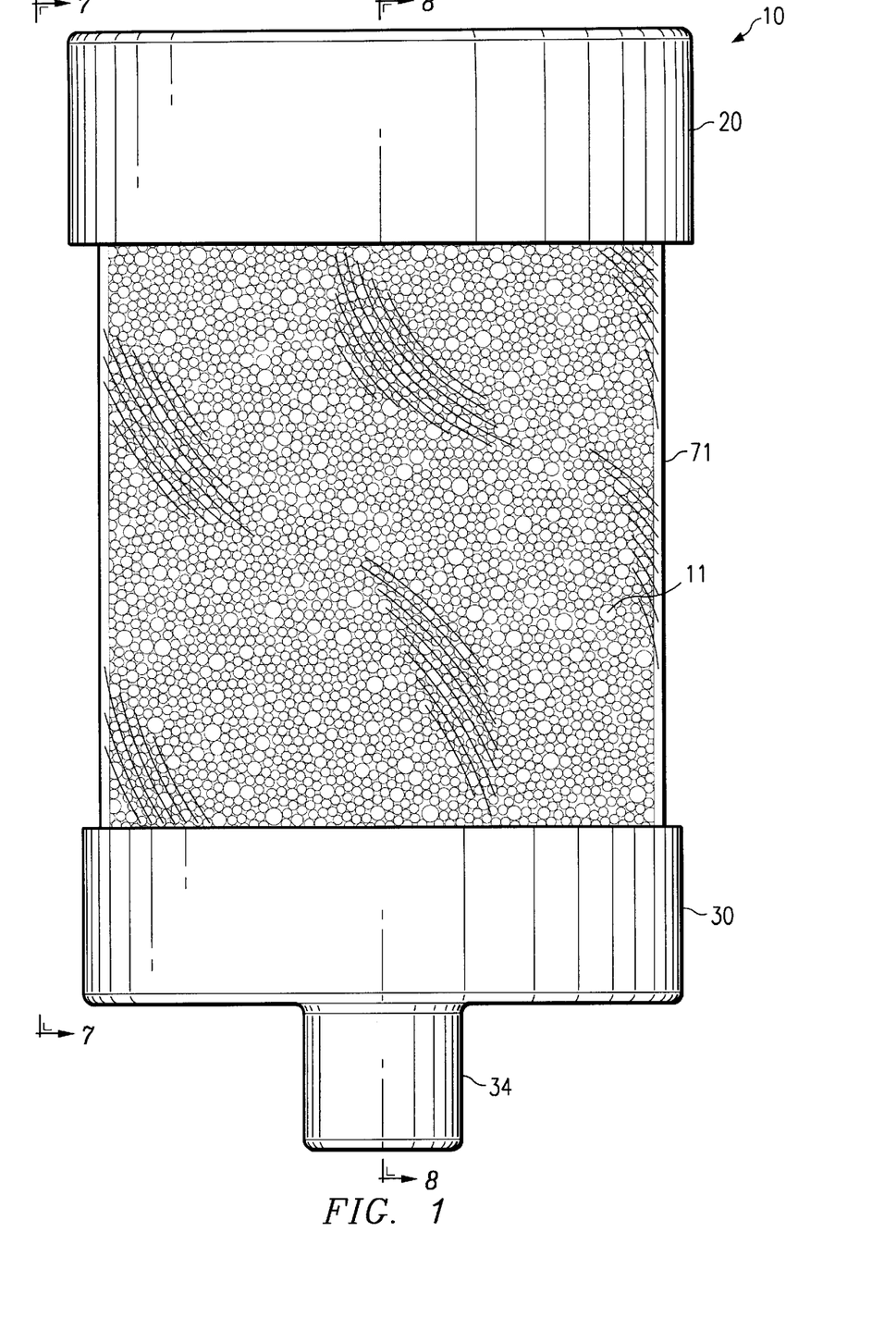
FIG. 1 is a pictorial view of the outside of the contamination control breather of the present invention.
Figure 8:
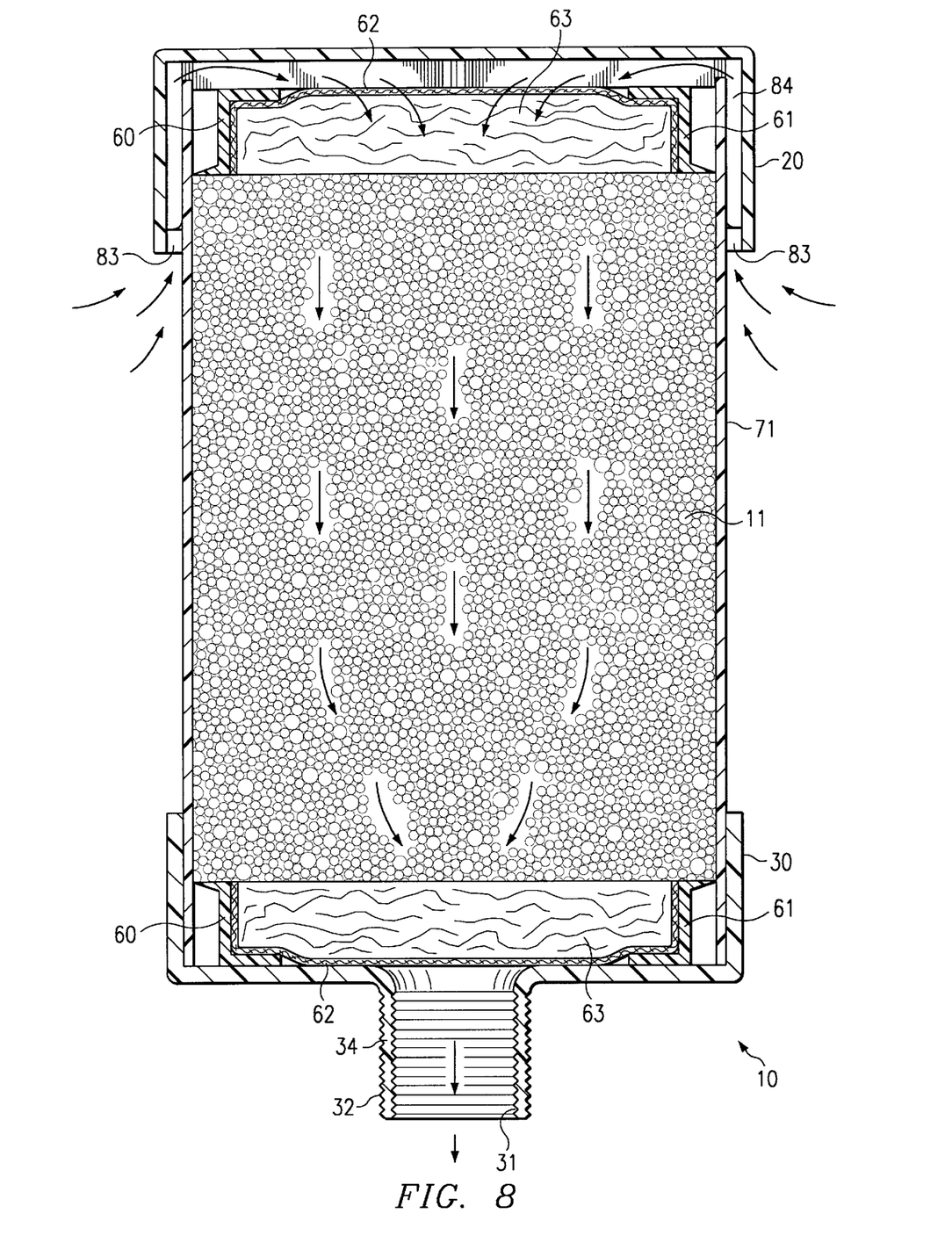
FIG. 8 is a sectional pictorial view in elevation of an embodiment of the present invention taken along section 8—8 of FIG. 1.

In the preferred embodiment, illustrated in FIG. 1 and shown in section in FIG. 8, outside air enters contamination control breather 10 through one or more passages created in air seal 83. Air then passes through channels 84 in the top cap of the breather. Air is then forced to enter filter assembly 60 and pass through filter cloth 62, which filters the particle contaminants. Air then passes through diffuser 63, which spreads the air around to optimize the use of desiccant 11. The desiccant contained in the tube of the breather removes water vapor and other gases or liquids from the air. After these contaminants are removed, the air passes through a second filter assembly 60, which is located in the bottom of the tube. Finally, the air passes through neck 34 into the container (not shown in the figure). The arrows show the direction of air flow. To better understand the operation of the breather, a detailed description of the different parts of the breather is given below.

Figure 11:
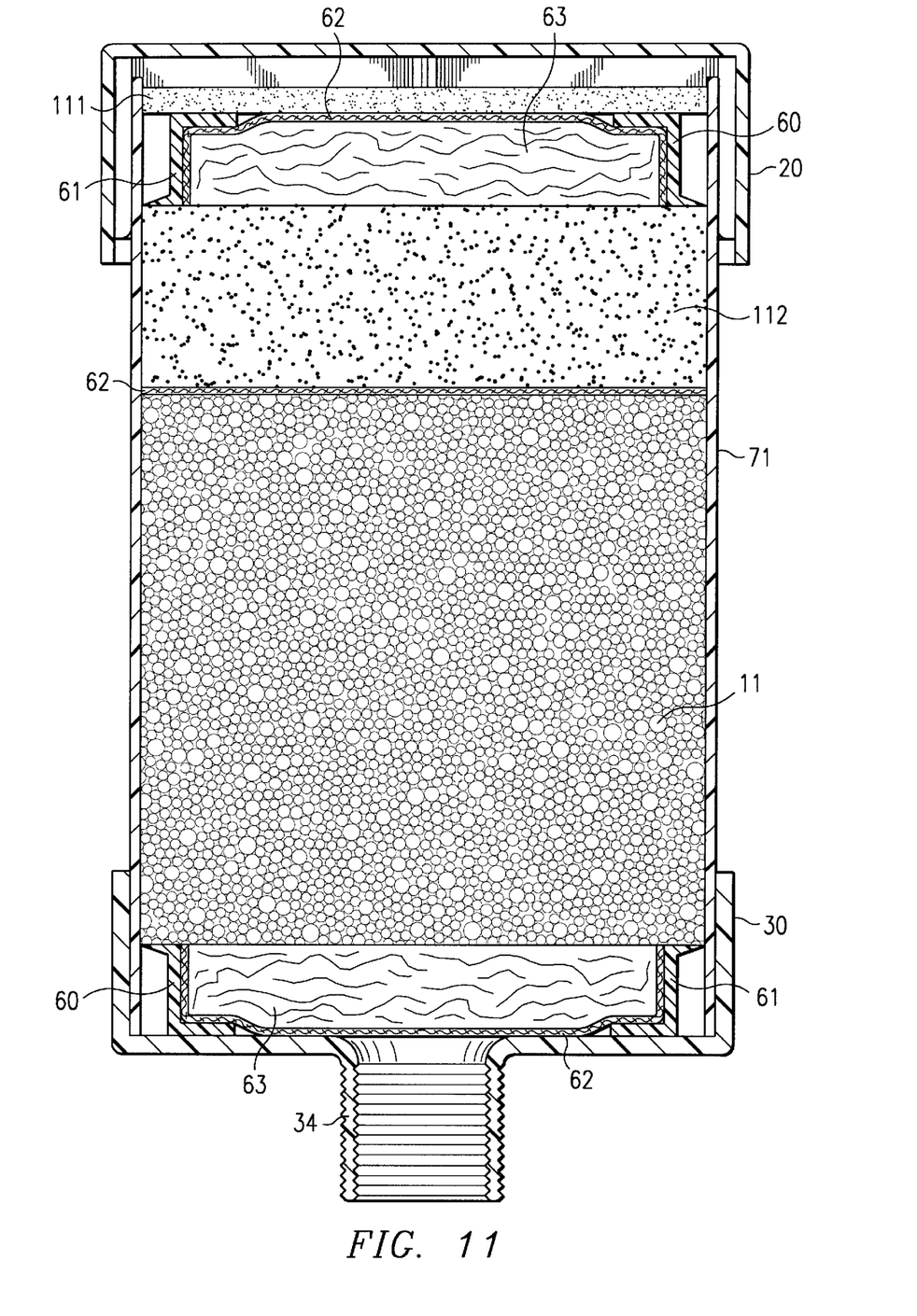
FIG. 11 is a sectional pictorial view in elevation of an alternative embodiment of the breather of the present invention illustrating the construction of the breather.

As shown in FIG. 1, contamination control breather 10 includes a top cap 20, an elongated body 71 and a bottom cap 30. The body 71 can be made of transparent material, preferably acrylic. The transparency allows the user to see the inside of the tube which is filled with desiccant 11, preferably silica gel, that changes color to indicate that the desiccant has reached its maximum adsorbing capacity. The desiccant may be mixed with other substances capable of absorbing other gases, such as fumes and odors. A layer of activated charcoal 112 may be located inside the body 71, as shown in FIG. 11. The inside of the tube may also be filled with other substances that absorb certain liquids. Advantageously, such a breather can be used in factories, such as food processing plants or battery recharge centers etc., to remove undesirable solids, gases and liquids from the air or it can be used with any container or machine requiring clean air.

In another embodiment of the present invention, the inside of the tube may be filled only with activated charcoal to remove fumes and odors being expelled from a container or machinery to protect the environment.

Figure 5:
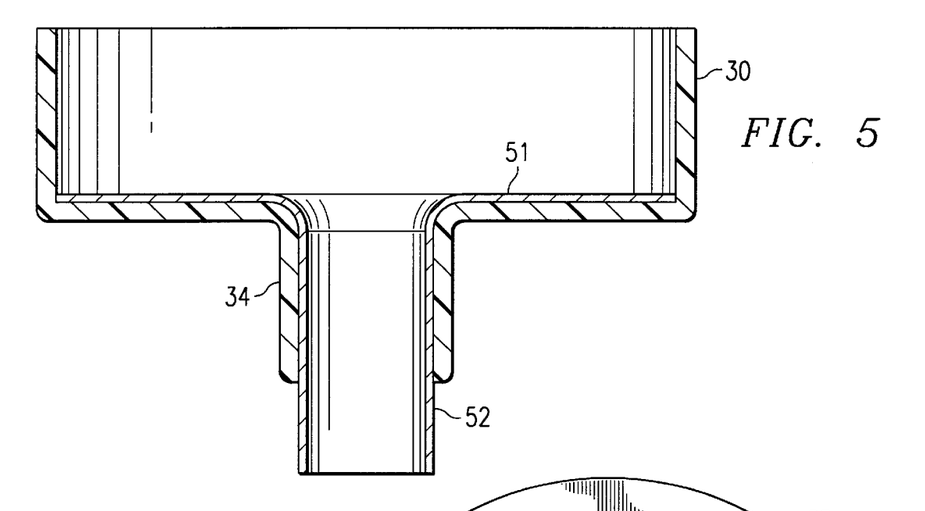
FIG. 5 is a sectional view of an alternative embodiment of the bottom cap, taken along section 5—5 of FIG. 3.

Bottom cap 30 has a central aperture connecting to neck 34. Neck 34 may, if desired, be externally or internally threaded to mate with a complementary threaded fitting on the fluid container. Alternatively, neck 34 may be bonded to a mating opening on the container. The connection may be surrounded by a stiff rubber or other air tight seal to make it impervious to air. The bottom cap is preferably made of plastic. In the alternative, the bottom cap may be reinforced with metal and a pipe connected to the metal plate that goes directly inside the container. The metal reinforced bottom cap may be used in conjunction with any of the other embodiments. The advantage of such a system is to eliminate the stress on the neck of the bottom cap. This is useful in case of containers that vibrate or rotate substantially during their normal operation. This alternative embodiment is shown in FIG. 5.

Figure 2:
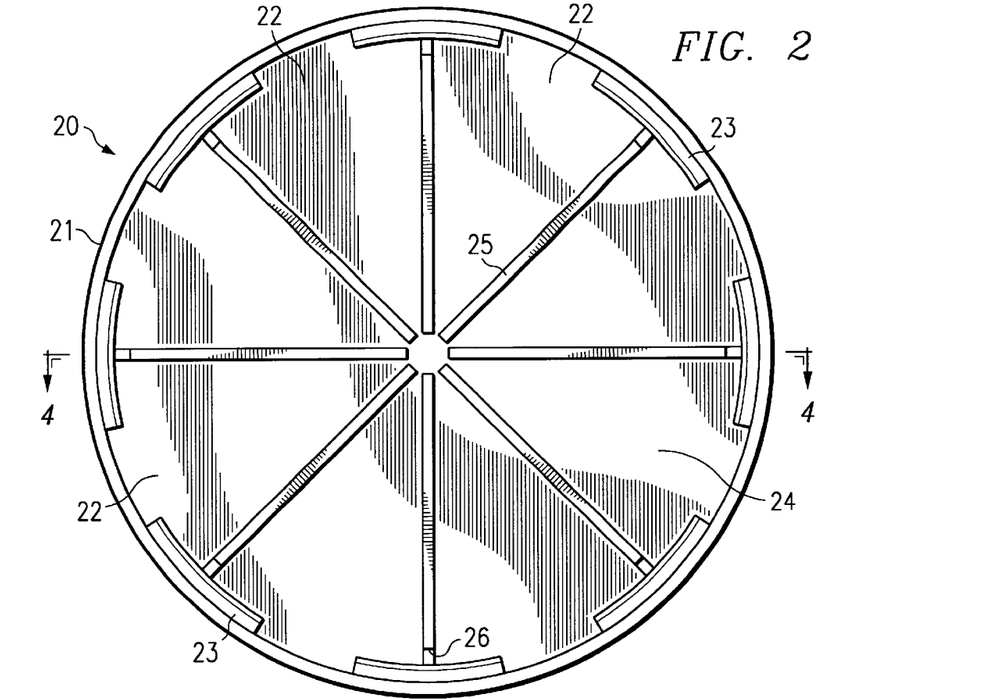
FIG. 2 is the inside view of the top cap of the breather.

FIG. 2 is the inside view of top cap 20. The top cap is made preferably of plastic. Top cap 20 has ridges 23 along rim 21. These ridges 23 are not continuous, but have openings 22 to allow the air to enter cap 20. The inside of top cap 20 is preferably crisscrossed with thin support structures 25. These structures are glued or molded, to the top inside surface of top cap 20.

Figure 4:
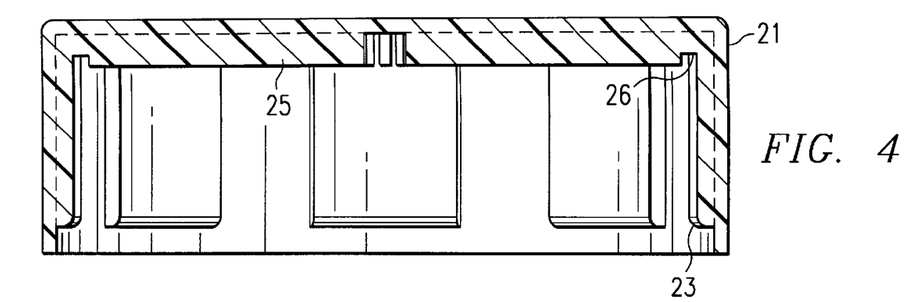
FIG. 4 is a sectional view of the top cap of the breather taken along section 4—4 of FIG. 2.

FIG. 4 shows a sectional view of the top cap across one of the support structures 25 (section 4—4 of FIG. 2). Openings 22 (shown in FIG. 2) along the rim and the space between the support structures combine to form air channels 24 (shown in FIG. 2). The air enters the breather through openings 22, and travels in the air channels. Openings 22 may be initially blocked by individual air seals so that there would be no air circulation inside the breather prior to installation on the container. These individual air seals can be easily removed without the help of any tools. Furthermore, the amount of air going in the breather can be controlled by limiting the number of openings that are available, by having each seal separately removable. In the alternative, all the openings may be blocked by a single air seal (not shown in the figure).

Support structure 25 runs from ridge 23 to the center of the cap. The point 26 at which the support structure 25 joins the ridge 23 is slightly thinner than the remainder of the structure. This prevents the tube 71 (shown in FIG. 1) from touching the top of the cap 20. Thus, there is a gap between the tube and cap 20, through which incoming air can pass to the inside of the tube. The top cap may be permanently glued onto tube 71 and need not be air tight. In the alternative, the top cap can be connected to the tube via non-permanent glue, snaps, hooks, latches, or screws, which would facilitate easy removal of the cap from the tube. The top cap can also be provided with internal threads to facilitate easy removal. In such an embodiment, the tube should be provided with complementary threads.

Figure 3:
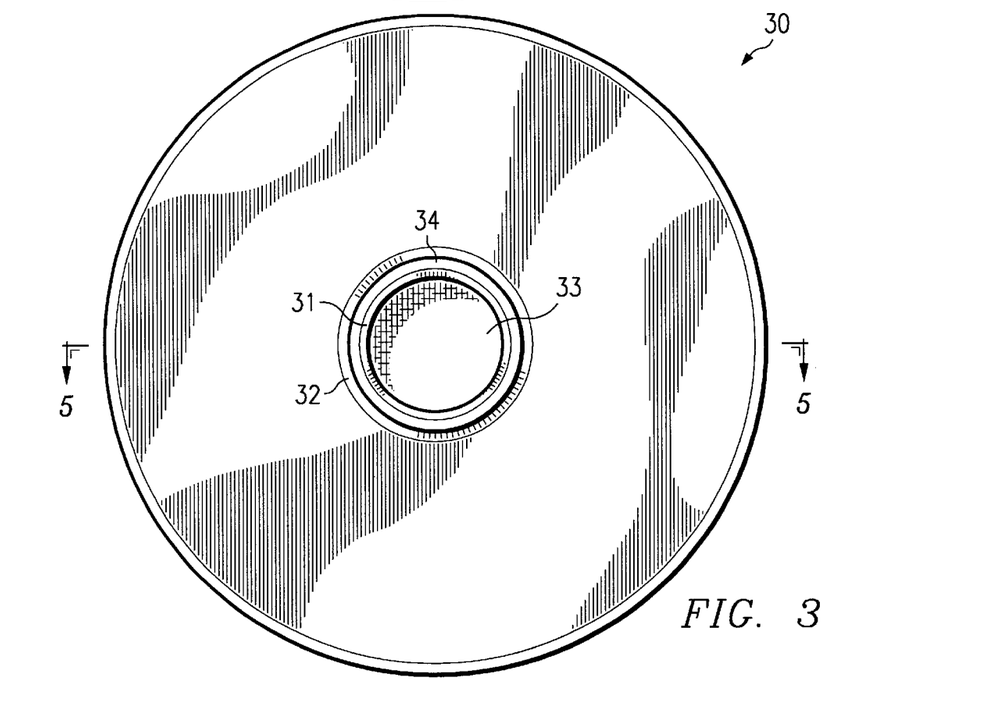
FIG. 3 is the outside view of the bottom cap of the breather.

FIG. 3 is the outside view of bottom cap 30. The bottom cap is made preferably of plastic. Bottom cap 30 has a neck 34 (shown in FIG. 1) going through a central aperture 33 in the cap. Neck 34 may be threaded internally 31 or externally 32 to allow the bottom cap to mate with a complementary threaded opening attached to the container. In the alternative, adapters may be used to make air tight connections between neck 34 and the containers. If desired, the bottom cap may be reinforced with metal. Also, a permanent airtight connection with the container may be made. The advantage of such an arrangement is a reduction in cost over the long run, by eliminating the need to change the entire breather when the desiccant has reached its maximum adsorption capacity. In such cases, only the tube-filter assembly 70 (shown in FIG. 7) needs to be replaced.

FIG. 5 is an alternative embodiment of bottom cap 30. In this embodiment, bottom cap 30 is reinforced with metal plate 51. The metal plate has pipe 52 which passes through a central aperture in the metal plate. This pipe can be inserted into neck 34 of bottom cap 30. The bottom cap can be permanently fixed to the container or threaded to mate with a complementary threaded fitting on the container or neck 34 may be bonded to a mating opening on the container. This is especially useful when the container vibrates substantially during its normal operation. Also, because the metal plate has an attached pipe, the air can pass directly from the bottom cap to the container, through the pipe. Thus, the connection remains air tight.

Figure 12:
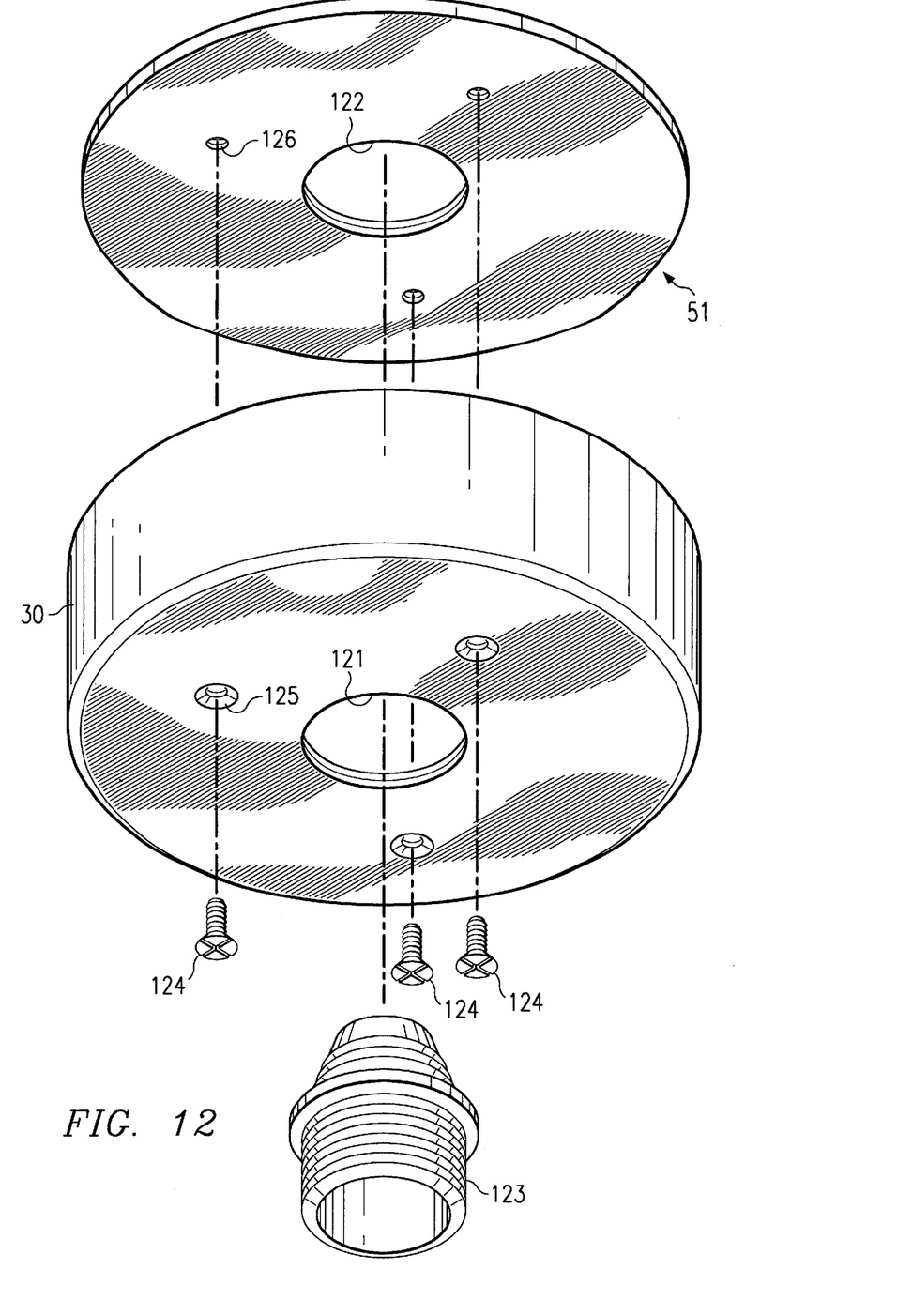
FIG. 12 is another alternative embodiment of the bottom cap.

FIG. 12 is another alternative embodiment of bottom cap 30, illustrating an alternative connection between metal plate 51 and bottom cap 30. In this embodiment, bottom cap 30 contains clearance hole 121, instead of the neck. Clearance hole 121 opens to tapped hole 122 in metal plate 51, thereby allowing a pipe nipple 123 or other fitting to pass through it. Pipe nipple 123 or other fitting may be screwed into tapped hole 122, creating a metal to metal connection. If desired, tapped hole 122 can be different sizes for different applications. Bottom cap 30 and metal plate 51 contain holes 125 and 126 respectively that may be collocated. Metal plate 51 is secured to bottom cap 30 with the help of machine screws 124, which pass through holes 125 and 126 in bottom cap 30 and metal plate 51 respectively.

In both the alternative embodiments of the bottom cap, the bottom cap has molded in threads on the inside rim. The tube has threaded rings glued to or molded into the body near the bottom. The advantage of both these embodiments is that the bottom cap is strengthened and thus not easily broken. Moreover, any embodiment of the bottom cap may be used with any embodiment of the rest of the breather.

Figure 6:
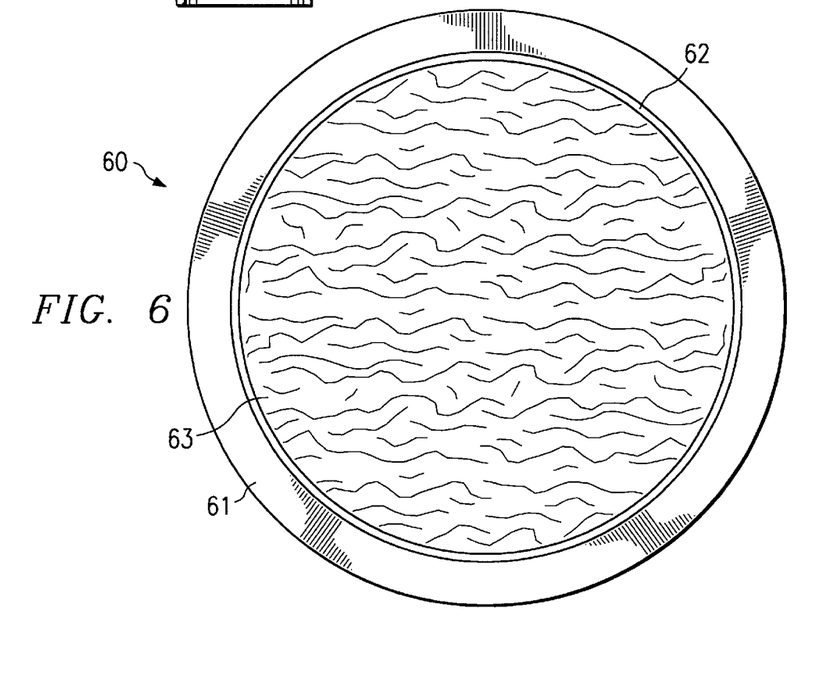
FIG. 6 is a view of the filter assembly from inside the tube.

FIG. 6 is a view of filter assembly 60 from inside the tube. Filter assembly 60 includes an outside wiper ring 61, a filter cloth 62, and a diffuser 63. Diffuser 63 is enclosed by filter cloth 62 on all sides, except the side facing the desiccant. Diffuser 63 is then put inside wiper ring 61, such that filter cloth 62 is in between wiper ring 61 and diffuser 63. This ensures that all the incoming air is forced to pass through both the filter cloth and the diffuser. The diffuser spreads the incoming air around so that optimum use of the desiccant may be made. The filter cloth is preferably a 2 micron particle filter, which is knit differently on both sides, such that when the air comes in, the cloth becomes a filter (by closing down) and prevents the solid particles from passing through. On the other hand, when air flows out of the container into the filter, the cloth opens up, and allows partial cleaning of the filter cloth. Carbon fibers in the filter cloth reduce the potential of static electricity, and thus reduce the potential of an explosion that may exist in a dusty environment. The diffuser is preferably a polyester pad. The thin edge of wiper ring 61 seals tightly against the inside of tube 71 (shown in FIG. 7) preventing the air from entering the tube without first going through the filter assembly, thus ensuring that all air coming into the breather passes through filter assembly 60 at the top of the breather, before passing through the desiccant.

In an alternative embodiment, a porous disc may also be located in the filter assembly. This porous disc is made up of different materials, including silica, chrome, nickel, vanadium and a bonding agent. In the preferred embodiment the percentages of these components are approximately 85, 6, 4, 2, and 3 respectively. Of course, the metal plate may be composed of different elements in varying proportions. This disc retards flames which might enter the breather.

Figure 7:
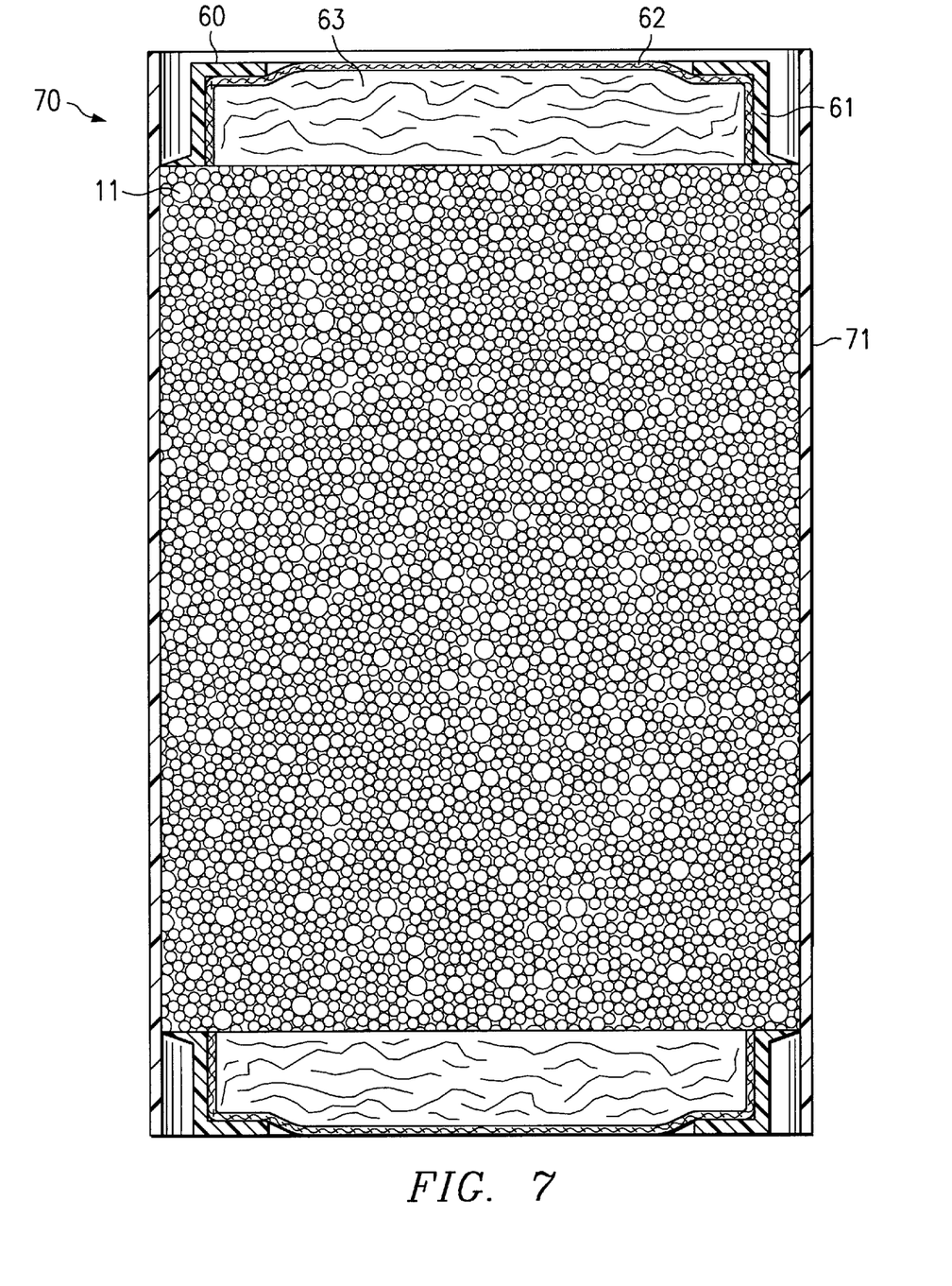
FIG. 7 is a sectional view of the tube-filter assembly, taken along section 7—7 of FIG. 1.

FIG. 7 shows a sectional view of the tube-filter assembly 70. Tube-filter assembly 70 includes the tube 71, two filter assemblies 60 inserted into the tube near the bottom and top of the tube 71, and desiccant 11. Diffuser 63 is covered on all sides, except one side, by filter cloth 62. The enclosed diffuser is then placed into wiper ring 61, and the entire filter assembly 60 is inserted into the bottom of the tube 71 with the uncovered face of diffuser 63 facing upward. Tube 71 is then filled with desiccant 11 up to about 1" from the top of the tube. Tube 71 may also be filled with other material capable of absorbing gases or liquids, in addition to or in place of desiccant 11. Another filter assembly 60 is then inserted into the top portion of tube 71, with the uncovered face of diffuser 63 facing downwards. The length of tube 71 and the amount of desiccant 11 may be varied depending on the type of use. The thin edge of wiper ring 61 of filter assembly 60 seals tightly against the inside of tube 71, thus preventing the air from moving into the tube without first passing through the top filter assembly 60. Furthermore, any number of filter assemblies 60 or each individual component of filter assembly 60 may be inserted between the two ends of the tube depending upon the type of use. Also, if desired, tube 71 may be filled with other types of chemicals or other material to remove other liquids or gases, such as odors or fumes, from the air. For example, tube 71 may be filled with activated carbon in place of desiccant to remove fumes or odors being expelled from air displacement systems, thereby protecting the environment and also the workers in the vicinity of the air displacement system. Threads, latches, snaps, hooks, and/or screws may be provided both near the bottom and near the top of tube-filter assembly 70, so that top cap 20 and bottom cap 30 may be easily removed from assembly 70. The advantage of such an arrangement is that one of the caps may be permanently fixed to the fluid container. Thus, when desiccant 11 has reached its maximum adsorption capacity, assembly 70 can be replaced. In such an arrangement, there is no need to change the caps. This reduces the cost of replacements. This is especially useful where the cap is reinforced with metal.

FIG. 8 is a pictorial view in elevation of an embodiment of the present invention in full section (section 8—8 of FIG. 1) illustrating its construction and operation. Bottom cap 30 is glued to the bottom of the tube-filter assembly creating an airtight seal. Top cap 20 is glued to the top of the tube-filter assembly. This is not an airtight seal. Channel 84 is initially blocked by individual air seals 83, so that there would be no air circulation inside prior to installation on the container. When seal 83 is removed, air can enter the breather through the opening. Air passes through the air channels, first slightly upwards, and then parallel to the top surface of cap 30 along the channels. The air then enters tube-filter assembly 70 and passes through filter cloth 62. Air is prevented from circumventing filter assembly 60 by the wiper ring 61 that surrounds diffuser 63. Filter cloth 62 filters the particulate matter from the air. This is the first level of filtration. Air then passes through diffuser 63. Diffuser 63 acts as a second level of filtration for the air, and also spreads the air around to optimize the use of desiccant 11. Next the air passes through a substantial amount of desiccant 11. This is the third level of filtration, which removes water vapor from the air. If the desiccant contains other chemicals, then other gases and liquids are also removed from the air at this stage. Next the air passes through a second diffuser 63. The second diffuser removes desiccant particles. This is the fourth level of filtration. After this the air moves through a fifth level of filtration which is a second filter cloth 62 associated with the bottom filter assembly 60. The clean and dry air then passes through neck 34 of bottom cap 30 into the container (not shown in the figure).

When air is leaving the container, it passes through filter cloth 62 in the bottom filter assembly 60. However, since the filter cloth is knitted differently on both sides, the cloth opens up and the dust particles are allowed to pass through. If the outgoing air does not contain any dust particles, the cloth still opens up to allow partial cleaning ("backflush") of the filter cloth. After passing through bottom filter assembly 60, the outgoing air passes through the desiccant 11. This outgoing air partially regenerates the desiccant. Thus, the "backflushing" of the filter cloth and the partial regeneration of the desiccant prolongs the life of the breather. After passing through the desiccant and filter assembly 60 at the top of the tube-filter assembly, the outgoing air passes through channels 84 and is expelled through the opening created by removal of air seal 83.

Figure 9:
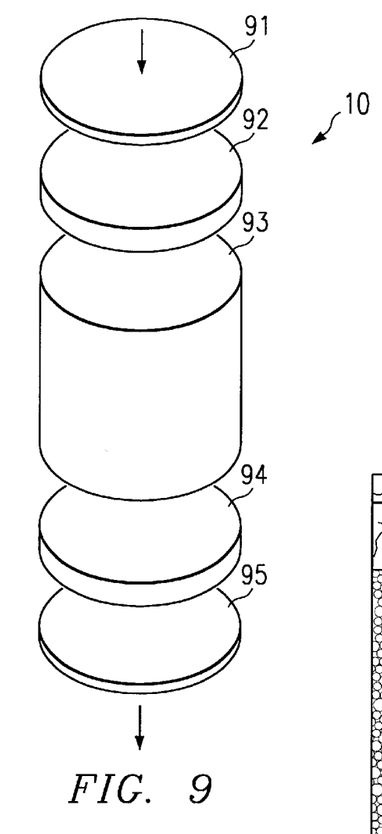
FIG. 9 is an exploded view of the breather of FIG. 1 illustrating the treatment of air passing through it.
Figure 10:
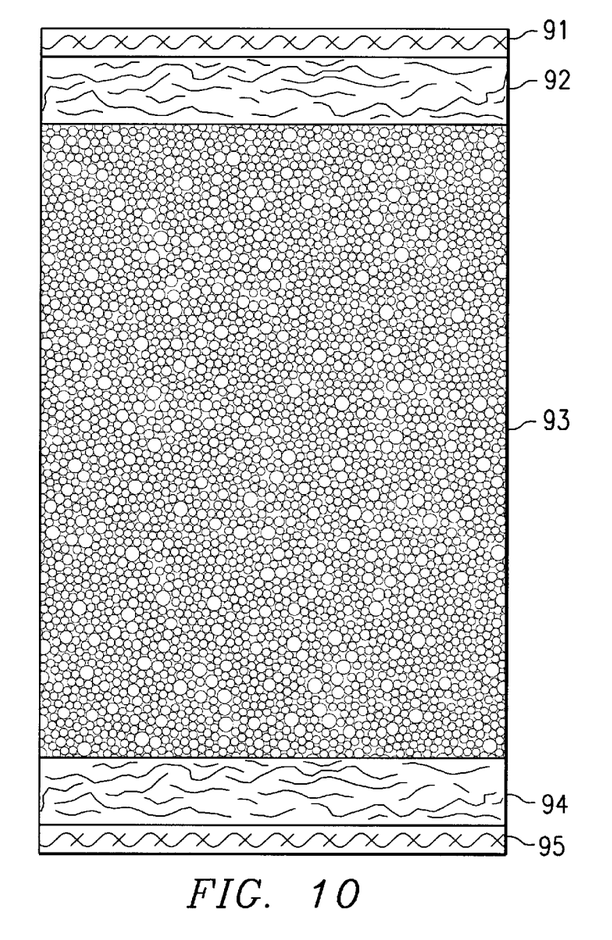
FIG. 10 is an illustration of the different layers of treatment the air goes through in the embodiment of FIG. 1, before entering the container.

FIG. 9 is an exploded view of the breather shown in FIG. 1. FIG. 10 illustrates the different layers of filtration the air passes through, before entering the fluid container. Filter cloth 91 is the first level of filtration that removes particulate contamination, and diffuser 92 is the second level of filtration, wherein the air is diffused to optimize the use of the third level. The third level is desiccant 93 which removes the water vapor, and in appropriate cases other gases and liquids from the air. The next level of filtration is diffuser 94. Finally, the air passes through filter cloth 95, which is the last level of filtration before entering the fluid container (not shown in the figures).

FIG. 11 is an alternative embodiment of the contamination control breather. In this embodiment, bottom cap 30 is removably attached to the bottom of the filter-tube assembly with an airtight seal. The attachment may be formed via non-permanent glue, snaps, hooks, latches, or screws, which would facilitate easy removal of the cap from the tube. Bottom cap 30 can also be provided with internal threads to facilitate easy removal. In such an embodiment, tube 71 should be provided with complementary threads. In the alternative, bottom cap 30 may be fixedly attached to the bottom of the filter-tube assembly with an airtight seal. The attachment may be formed via glue or any other means capable of attaching permanently. Top cap 20 has air channels to allow air to enter or exit the breather. Air or other gases leaving the container (not shown in the figure) may contain contaminants in the form of gases, liquids or solid particles. These contaminants may present fire hazards or cause corrosion to other equipment near the breather. The air or gas leaving the container, or other air displacement or gas producing systems, enters the breather through neck 34 in bottom cap 30. It passes through filter cloth 62 in the bottom filter assembly. However, since the filter cloth is knitted differently on both sides, the cloth opens up and solid particles are allowed to pass through. If desired filter cloth 62 may be reversed to prevent solid particles from passing through in a particular direction. In the absence of any dust particles, the filter cloth is partially cleaned by the outgoing air. Air then passes through desiccant material 11, preferably silica gel, which is located inside the tube-filter assembly along a cross-section of the breather. This layer of silica gel removes combustible gases, like hydrogen vapor, that is contained in the outgoing air. Such systems are useful in environments where open flames are being used close to the breather. For example, open flames are often used in battery recharge centers.

In certain circumstances, the outgoing air partially regenerates the desiccant material, prolonging the life of the breather. After the layer of desiccant material is filter cloth 62. Filter cloth 62 separates the layer of silica gel 11 from a layer of activated charcoal 112, preferably carbon, which is also located inside the tube-filter assembly along a cross-section of the breather. If desired, a filter assembly may be used in place of filter cloth 62. This filter assembly may be different from the filter assembly near the bottom of the breather. The layer of activated charcoal 112, removes corrosive gases, like sulphuric acid gas, from the outgoing air. Such systems protect expensive equipments from being corroded and thus, reduce operating costs. Since the useful life (adsorption capacity) of desiccant 11 is less than that of activated charcoal 112, in the preferred embodiment, the proportion of desiccant 11 to activated charcoal is approximately 3 to 1. Of course, this proportion may be varied depending on the use and the particular environment in which the breather is used. Above the layer of activated charcoal 112 is a third filter assembly. Metal disc 111 is located near the top of the breather above the third filter assembly.

It should be appreciated by those skilled in the art that although FIG. 11 depicts tube 71 to include two materials, i.e. desiccant 11 and activated charcoal 112, additional materials may be included to filter out other contaminants. Each material is separated by filter cloth 62 or filter assembly 60. The arrangement of separate layers for each material shown in FIG. 11 is preferred over a single layer with a mixture of all materials. A single layer arrangement cannot ensure that air passes through each material. On the other hand, a single layer arrangement may be desirable when different materials together are used to filter a particular contaminant. Note that the different materials, e.g. desiccant or charcoal, may be ordered according to the direction of air flow. For example, if a particular filtering material is harmed by a contaminant, e.g. sulphuric acid vapor, then a filter material, e.g. charcoal, to remove the contaminant should be placed so as to remove the contaminant before it harms the particular filter material. If desired, any particular filter material may be repeated in any order within the tube, e.g. the layer of desiccant material could be between two layers of activated charcoal. Moreover, since the saturation levels of different filter materials is not the same, the amount of a particular material may be preselected to ensure that the materials saturate at approximately the same time.

In the preferred embodiment, metallic disc 111 is porous. Metallic disc 111 retards flames that might enter the breather, especially in environments, like battery recharge areas, where there are open flames in the vicinity of the breather. The composition of the metal plate preferably includes silica, chrome, nickel, vanadium and a bonding agent. In the preferred embodiment the percentages of these components are approximately 85, 6, 4, 2, and 3 respectively. Of course, the metal plate may be composed of different elements in varying proportions. Also, the location of activated charcoal 112 with respect to desiccant 11 may be changed depending on the use, since water vapor passing through the breather shortens the life of activated charcoal 112. For example, in some cases activated charcoal 112 may be located below desiccant 11. In other cases, the activated charcoal may be located between two layers of desiccant so that water vapor passing through the breather is adsorbed by the desiccant before it reaches the activated charcoal. In this embodiment, many layers of desiccant and activated charcoal could be arranged in different order.

Although the present invention and its advantages have been described in detail, it should be understood that various changes, substitutions and alterations can be made herein without departing from the spirit and scope of the invention as defined by the appended claims.

What is claimed is:

1. A contamination control breather that processes unfiltered air into filtered air, the breather comprising:
   an air impervious elongated body open at a first distal end of the body and a second distal end of the body;
   a first cap attached to said first end for allowing the filtered air to exit the elongated body through an aperture in said first cap;
   a second cap attached to said second end for allowing the unfiltered air to enter said elongated body to pass through said elongated body to said first cap;
   wherein said aperture in said first cap connects to a neck, said neck being air impermeably attached to a container that uses filtered air; and
   wherein said first cap further comprises a metal plate with an aperture therethrough, for reinforcing said first cap, wherein said aperture of said metal plate is collocated with said aperture of said first cap.

2. The contamination control breather of claim 1, wherein said first cap further comprises:
   a pipe located in said aperture in said metal plate is coupled to said container to form an airtight connection with said container.

3. A contamination control breather that processes unfiltered air into filtered air, the breather comprising:
   an air impervious elongated body open at a first distal end of the body and a second distal end of the body;
   a first cap attached to said first end for allowing the filtered air to exit the elongated body through an aperture in said first cap; and
   a second cap attached to said second end for allowing the unfiltered air to enter said elongated body to pass through said elongated body to said first cap;
   wherein said first cap further comprises a rim that is threaded on an inside surface.

4. A contamination control breather that processes unfiltered air into filtered air, the breather comprising:
   an air impervious elongated body open at a first distal end of the body and a second distal end of the body;
   a first cap attached to said first end for allowing the filtered air to exit the elongated body through an aperture in said first cap; and
   a second cap attached to said second end for allowing the unfiltered air to enter said elongated body to pass through said elongated body to said first cap;
   wherein said second cap comprises
      a rim; and
      at least one ridge located along an inside of said rim, wherein said at least one ridge has a plurality of openings to facilitate air to pass through.

5. The contamination control breather of claim 4, wherein said second cap further comprises:
   a plurality of thin support structures radially disposed from a center of said second cap to said at least one ridge, along an inside upper surface of said second cap.

6. The contamination control breather of claim 5, wherein said plurality of support structures are thinner at a point where said plurality of support structures meet said at least one ridge, thereby preventing said elongated body from coming in contact with said upper inside surface of said second cap, thereby allowing air to pass through to said elongated body.

7. The contamination control breather of claim 6, wherein each opening of said plurality of openings is sealed by a respective air seal of a plurality of air seals.

8. The contamination control breather of claim 7, wherein each air seal of the plurality of air seals is independently removable with respect to the remainder of the plurality of air seals, thereby controlling the amount of air passing through the breather.

9. The contamination control breather of claim 6, wherein said plurality of openings are sealed by a single air seal.

10. The contamination control breather of claim 9, wherein said single air seal is removable, thereby allowing air to pass through.

11. A contamination control breather that processes unfiltered air into filtered air, the breather comprising:
    an air impervious elongated body open at a first distal end of the body and a second distal end of the body;
    a first cap attached to said first end for allowing the filtered air to exit the elongated body through an aperture in said first cap;
    a second cap attached to said second end for allowing the unfiltered air to enter said elongated body to pass through said elongated body to said first cap;
    wherein said aperture in said first cap connects to a neck, said neck being air impermeably attached to a container that uses filtered air; and
    wherein said first cap further comprises a metal plate with an aperture therethrough, for reinforcing said first cap, wherein said metal plate is secured to a lower inside surface of said first cap.

12. A contamination control breather that processes unfiltered air into filtered air, the breather comprising:
    an air impervious elongated body open at a first distal end of the body and a second distal end of the body;
    a first cap attached to said first end for allowing the filtered air to exit the elongated body through an aperture in said first cap;
    a second cap attached to said second end for allowing the unfiltered air to enter said elongated body to pass through said elongated body to said first cap; and
    a filter cloth having a first side that is knitted differently from a second side, such that the filter cloth allows particles to pass through in one direction, but does not allow said particles to pass through in an opposite direction, wherein said filter cloth is positioned across an internal cross-section of the elongated body proximal to the first end.

13. The contamination control breather of claim 12, wherein the filter cloth is a two micron particle filter containing carbon fibers which reduces the potential of static electricity.

14. A contamination control breather that processes unfiltered air into filtered air, the breather comprising:

an air impervious elongated body open at a first distal end of the body and a second distal end of the body;

a first cap attached to said first end for allowing the filtered air to exit the elongated body through an aperture in said first cap;

a second cap attached to said second end for allowing the unfiltered air to enter said elongated body to pass through said elongated body to said first cap; and a filter assembly that is attached inside the body proximal to the second end, and said filter assembly seals tightly against the inside of the elongated body, thereby preventing air from bypassing said filter assembly;

wherein said filter assembly comprises a wiper ring having an edge on a peripheral portion.

15. The contamination control breather of claim 14, wherein said filter assembly further comprises:

a filter cloth having a first side that is knitted differently from a second side, such that the filter cloth allows particles to pass through in one direction, but does not allow particles to pass through in an opposite direction.

16. The contamination control breather of claim 15, wherein said filter assembly further comprises:

a pad for diffusing material that passes through said elongated body, wherein said pad is partially wrapped by the filter cloth, wherein said partially wrapped pad is contained within said wiper ring, such that said filter cloth is in between said pad and said wiper ring.

* * * * *